March 4, 1947.
I. WOLFF ET AL
2,417,032
ELECTRIC ALTIMETER
Filed Feb. 28, 1939
2 Sheets-Sheet 2
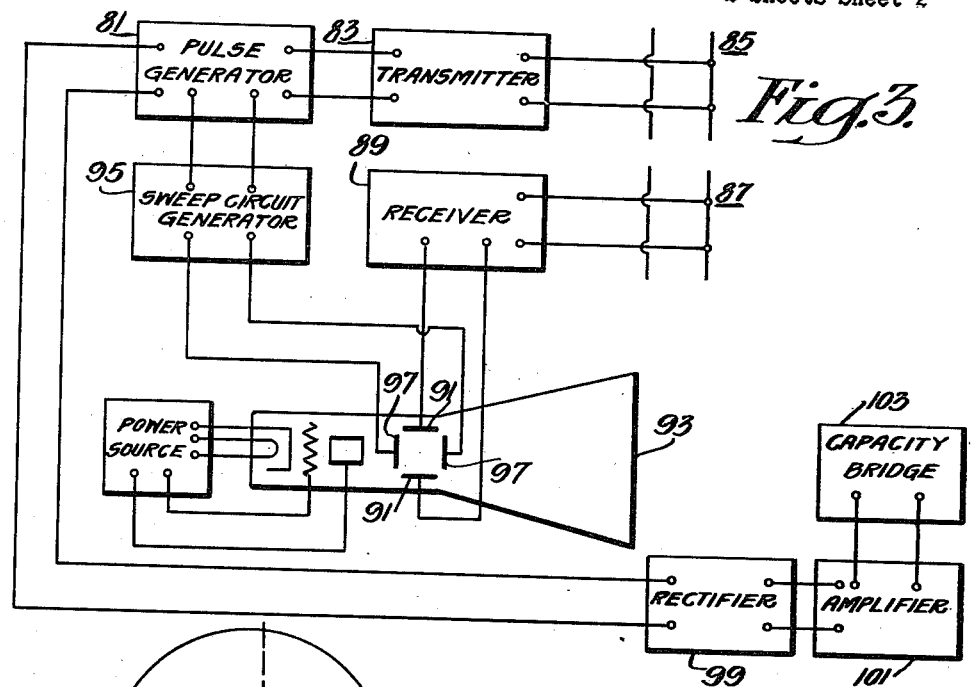
Fig.3.
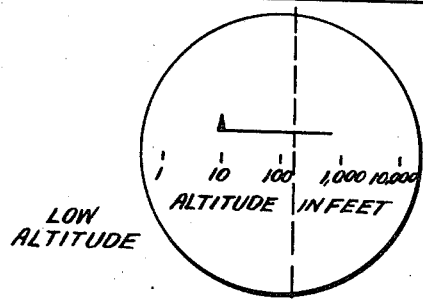
LOW ALTITUDE
Fig.4.ᵃ
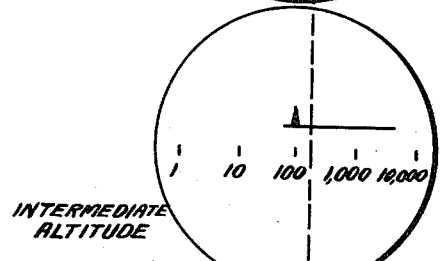
INTERMEDIATE ALTITUDE
Fig.4.ᵇ
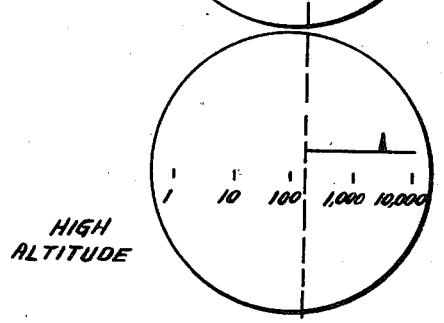
HIGH ALTITUDE
Fig.4.ᶜ
Inventors
Irving Wolff &
Jarrett L. Hathaway
By
Attorney Patented Mar. 4, 1947

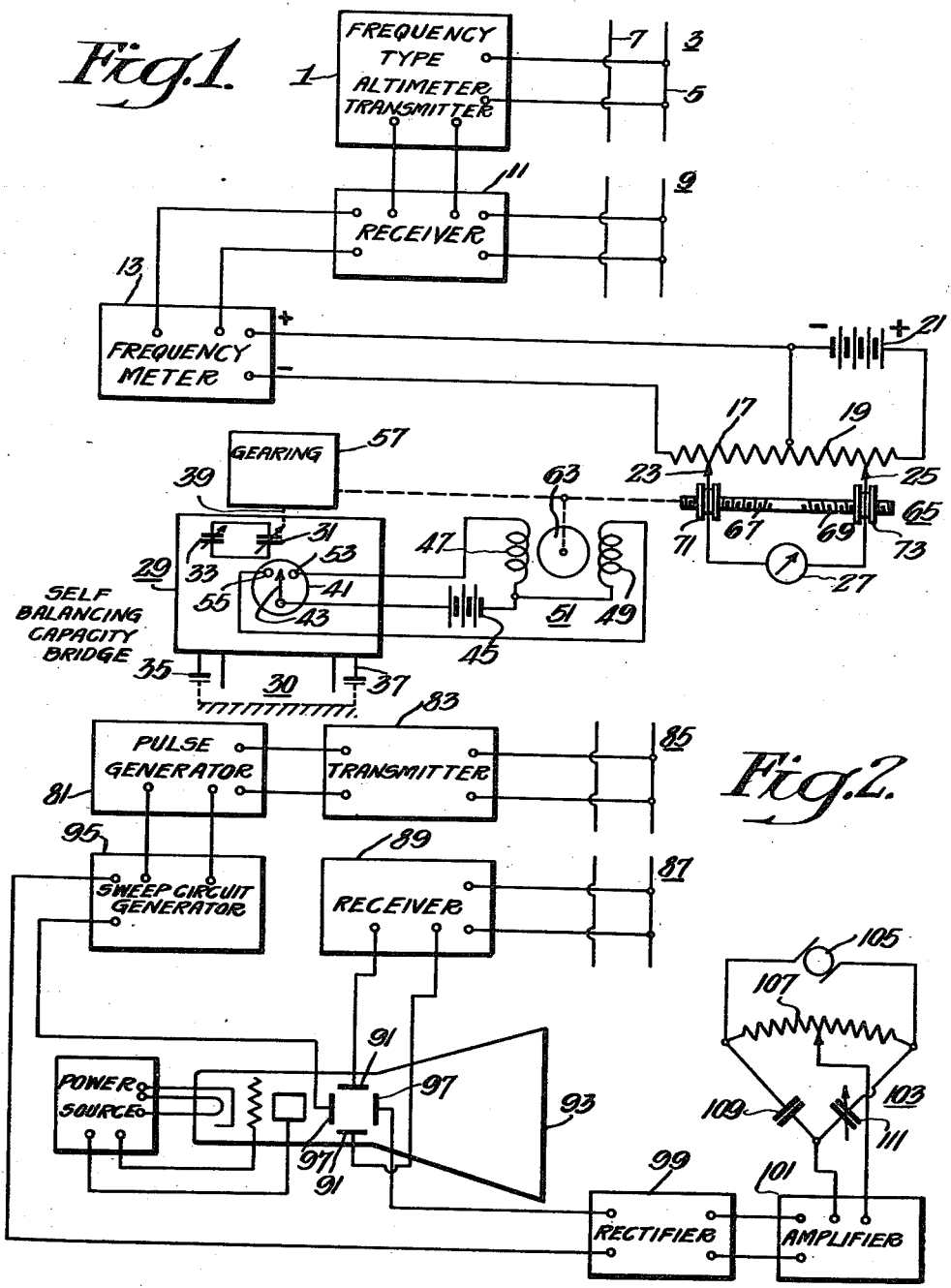

2,417,032

UNITED STATES PATENT OFFICE 2,417,032

ELECTRIC ALTIMETER

Irving Wolff, Merchantville, N. J., and Jarrett L. Hathaway, Manhasset, N. Y., assignors to Radio Corporation of America, a corporation of Delaware Application February 28, 1939, Serial No. 259,058

8 Claims. (Cl. 177—352)

This invention relates to aircraft altimeters in which high altitudes are determined by the time required to propagate radio frequency energy from such high altitude to the earth and back and in which low altitudes are determined by a change in an electrical network.

In the copending application of Jarrett L. Hathaway, Serial No. 259,066, filed February 28, 1939, entitled "Altimeter," a system has been disclosed for measuring altitude in which high altitudes are measured by the time required for pulses of radio frequency energy to be transmitted to the earth and back and in which the changes in the balance of an electrical bridge are used for determining lower altitudes. The indications of altitude are determined by peak voltmeter readings of an electrical timing wave which is suitably combined with the reflected pulses and energy from the electrical bridge.

The present invention represents an improvement of the Hathaway invention in that specific means are disclosed for combining the indications of a frequency type altimeter with the indications of a capacity bridge. The instant invention represents a further improvement by providing means which will not only indicate high and low altitudes but will differentially indicate the altitude with respect to a number of reflections. It is therefore one of the objects of this invention to disclose means whereby a frequency type altimeter for measuring higher altitudes may be combined with a capacity type altimeter for measuring lower altitudes. It is a further object to provide means for indicating altitude by a cathode ray tube which is combined with means for biasing the trace to indicate the lower altitudes. By the term "higher altitudes," distances of the order of from 100 feet and upward is meant; the term "lower altitudes" referring to distance determinations from approximately 200 feet to zero.

The invention will be described by reference to the accompanying drawing in which Figure 1 represents a schematic circuit of a frequency and capacity bridge type altimeter; Figure 2 is a circuit diagram of a cathode ray indicator for a pulse and capacity bridge type altimeter; Figure 3 is a modification of the pulse and capacity bridge altimeter circuit; and Figures 4a, 4b and 4c represent the indications obtained on the cathode ray tube.

Referring to Fig. 1, the frequency modulated transmitter 1 of a frequency type altimeter is connected to an antenna array 3 which includes a radiator 5 and one or more reflectors 7 which are used to beam the radiations. A second, and preferably similar array 9, is connected to a radio receiver 11 which is also connected to the transmitter portion of the altimeter. The foregoing elements may be of the type disclosed in Bentley U. S. Patent No. 2,011,392. The output of the receiver is applied to a frequency meter 13 including a direct current output. The frequency meter may be of the type disclosed in Sanders U. S. Patent No. 2,228,367. The output is applied to a first potentiometer 17. The first potentiometer is connected to a second potentiometer 19 across whose terminals is connected a battery 21. Movable contacts 23, 25 of the first and second potentiometer 19 across whose terminals is connected a battery 21. Movable contacts 23, 25 of the first and second potentiometers are connected to a meter 27. Either of the potentiometer windings may be suitably tapered to obtain any predetermined variation of resistance per unit length. The slidable contacts are operated by means which will hereinafter be described.

A self-balancing capacity bridge 29 is arranged as follows: A capacitor 30, varying as a function of the altitude, and a variable capacitor 31, preferably shunted by a trimmer capacitor 33, form two arms of the bridge. In practice the capacitor 30 includes two antennas 35, 37 which are shielded from each other and are arranged at the wing tips of the airplane, whose altitude is being determined. A meter type relay 41 is connected to the bridge to be operated as a function of the bridge balance. The movable contact 43 of the relay 41 is connected through a battery or other suitable source of power 45 to the field windings 47, 49 of a reversible motor 51. The fixed contacts 53, 55 of the relay are connected to the remaining terminals of the field windings. The shaft 39 of the variable capacitor is connected, through a suitable gearing 57 to the armature 63 of the motor. A screw 65 which includes reversely threaded portions 67, 69 is also connected to the armature. The reversely threaded portions respectively engage carriages 71, 73 which are connected to the movable contacts 23, 25.

The operation of the foregoing arrangement is as follows: An ultra high frequency oscillatory current is frequency modulated in the transmitter portion 1 of the altimeter. The thus modulated currents establish directively radiated waves. The waves travel to the earth and are reflected back to the antenna. After reflection, the waves induce electromotive forces in the antenna 9. These forces are applied to the receiver 11 and may be amplified therein. During the interval required for the transmission and reflection of the wave the frequency is changing and, therefore, the outgoing radiations and the incoming reflections will be of a different frequency. The transmitter portion 1 and the receiver portion 11 are interconnected so that currents of the frequency of the transmitted wave may be combined with currents of the frequency of the reflected wave to form currents of a beat frequency.

By measuring this beat frequency, the distance traveled by the wave, and hence the altitude of the device, may be indicated. A preferred method of measuring beats is to use a counter type circuit such as shown in the Sanders patent cited above. The counter provides rectified currents which are applied to the potentiometer 17. Since the frequency of the beats or the counts increases with altitude, the average potential across the potentiometer 17 will increase with altitude and will be approximately proportional thereto. If the electrical bridge is balanced at an altitude of the order of 200 feet, an unvarying potential will be applied to the contact 25 by the battery 21. As the altitude increases, the capacity bridge will stay substantially balanced and the rectified currents applied to the first potentiometer 17 will be approximately proportional to the altitude. Thus the rectified or counter currents will be indicated by the meter 27 to indicate altitudes above about 200 feet.

As the altitude is diminished below approximately 100 feet, the currents from the frequency type altimeter will fluctuate and will no longer truly represent the altitude. But at this point the electrical bridge will become unbalanced only to be rebalanced by the operation of the balancing motor 51 upon the variable balancing capacitor 31. The balancing operation is arranged to move the slider 25 toward the junction of the first and second potentiometers. At the same time the slider 25 is moved the slider 23 is also moved toward the center. The motion of the slider 23 is introduced to eliminate the effect of the currents corresponding to the output of the frequency altimeter, which as explained is now unreliable, and to apply steady currents from the battery 21 to the potentiometer 19. At the extreme right of the slider 25 the altitudes of the order of 100 to 200 feet will be indicated. At the mid position of the slider 25 on the potentiometer 19, the potential will indicate approximately 50 feet. At the extreme left of the slider 25 the potential will be zero to indicate zero altitude. It should be understood that the constants of the bridge are adjusted so that this zero indication will correspond to zero altitude.

Referring to Fig. 2, a pulse generator 81 is connected to a transmitter 83. The transmitter output is applied to a directive antenna array 85. A receiving antenna array 87 is connected to the input of a receiver 89. The output circuit of the receiver is applied to the vertical deflecting electrodes 91 of a cathode ray tube 93. The pulse generator is connected to a sweep circuit generator 95, which may be of the type disclosed in the horizontal deflecting circuit of Fig. 1 of Tolson U. S. Patent No. 2,173,239. The output of the sweep circuit generator is applied to the horizontal deflecting electrodes 97 of the cathode ray tube. The output of a rectifier 99 is connected in series with the sweep circuit generator. The rectifier is connected to the output of an amplifier 101 whose input circuit is connected to the balanced portion of a capacity bridge 103. The bridge is comprised of a source of alternating current 105, resistive arms 107 and balanced capacities 109, 111. One of these capacitors includes electrodes which are preferably shielded from each other and arranged adjacent the wing tips of the airplane whose altitude is to be determined.

The operation of the foregoing arrangement is as follows: The sweep circuit generator establishes a timing wave and synchronizes the pulse generator. The pulse generator 81 establishes discrete pulses of a duration of the order of one-tenth of a microsecond. These pulses key the transmitter. The transmitter radiates pulses of high frequency energy which are directively radiated toward the surface of the earth and after reflection induce electromotive forces in the antenna 87. These forces are applied to the receiver 89. The output of the receiver includes potentials corresponding to the received pulses. These potentials deflect the cathode ray in a vertical direction. The sweep circuit generator potentials sweep the cathode ray along a horizontal path in synchronism with the transmission of pulses. Thus, the reflected pulses are displaced horizontally by an amount corresponding to the altitude.

In a system of this type, it is generally considered impractical to generate and receive pulses shorter than one-tenth of a microsecond. During this short interval of time, radio frequency energy travels 30 meters or approximately 100 feet. Since the waves must travel not only to the earth but back to the receiver, the pulse length limits the distances which may be measured. Below, say, 50 feet, which corresponds to the pulse length, it becomes impossible to measure accurately the distance.

In order that the readings corresponding to low altitudes may be indicated, the rectified potentials from the capacity bridge are applied to the horizontal deflecting electrodes to move the sweep toward zero as a function of the bridge balance corresponding to the lower altitudes. This arrangement makes it possible to balance the bridge at a predetermined altitude at which no additional biasing potentials are applied to the sweep circuit electrodes. As the altitude is diminished, the unbalancing of the bridge provides more and more current which is rectified to provide an increasing bias for the sweep circuit electrodes. This increasing bias gradually moves the reflected pulse toward zero as is indicated in Fig. 4a. At approximately the predetermined altitude, the reflected pulse indicates the altitude as is illustrated in Fig. 4b. At the higher altitudes the reflected pulse indicates the altitude as shown in Fig. 4c. If there are several reflections, which may occur from an uneven terrain, the several reflections will be distinctively indicated. This is an advantage as it informs the observer of the nature of the terrain, which may be hidden by fog or smoke.

A modified circuit for combining bridge and timing measurements is shown in Fig. 3. Reference numerals similar to those applied to Fig. 2 are applied to Fig. 3 to indicate similar elements. Since the elements are similar, it suffices to point out the single difference in the two circuits. In Fig. 2 the biasing voltages derived from the capacity bridge altimeter are applied to the horizontal deflecting electrodes of the cathode ray tube; in Fig. 3 the biasing voltages are applied to advance or retard the phase of the pulse generator with respect to the sweep. The pulse phase may be altered by applying a D.-C. biasing potential to preferably the first amplifier input circuit of a pulse generator of the character described in the copending application of Irving Wolff, Serial No. 182,418, filed December 30, 1937, and entitled "Apparatus for and method of pulse keying." If the pulse phase is retarded as a function of the bias determined by the unbalance of the capacity bridge altimeter, the reflected pulse will be moved toward zero to indicate thereby the lower altitudes. Above the intermediate altitude the bridge will be substantially balanced, therefore no bias will be derived, and the altitude indications will be dependent upon the conventional pulse timing method.

Thus the invention has been described as an altimeter in which an electrical bridge balance is used to indicate the lower altitudes. At intermediate and higher altitudes, a timing wave type of altimeter becomes effective. The bridge may be of the self-balancing type as indicated in one species of the invention, or the bridge output may be amplified, rectified, and applied to the sweep circuit of a pulse type altimeter. In a modification the bridge output is rectified and used to vary the phase of the keying pulse.

It should be understood that the characteristic curves of either type altimeter may be adjusted to obtain the desired response. The altimeter scale may be linear or hyperbolic. Various types of elements of the timing type of altimeter are well known to those skilled in the art and therefore do not require any detailed description. The invention is not predicated upon the use of any particular type of pulse generator, transmitter, receiver, sweep circuit, electrical bridge, or cathode ray tube. For example, the sweep potentials may be of sine wave or sawtooth form; the receiver may be of the superheterodyne or radio frequency amplifier type; and the electrical bridge may be any one of the several known varieties, operating upon change of reactance, radiation resistance or the like. In like manner, the bridge may be balanced at the surface of the earth or at any predetermined altitude.

We claim as our invention:

1. An altimeter including in combination a pulse type altimeter, a cathode ray indicator for said pulse type altimeter, an electrical bridge altimeter, means for deriving from said bridge biasing potentials varying as a function of the balance of said bridge, and means for applying said biasing potentials to said cathode ray indicator.

2. An altimeter including in combination a pulse type altimeter, a cathode ray indicator for said pulse type altimeter, an electrical bridge type altimeter, means for deriving from said bridge biasing potentials varying as a function of the balance of said bridge, and means for applying said biasing potentials to vary the phasing of the pulses of said pulse type altimeter.

3. An altimeter including in combination a pulse type altimeter, a cathode ray indicator for said pulse type altimeter, a balanced bridge type altimeter, means for deriving currents varying as the balance of said bridge, and means for applying said derived currents to vary the indications of said pulse type altimeter as a function of said balance.

4. An altitude indicating device including in combination a sweep circuit generator, a pulse generator synchronized by said sweep, a transmitter keyed by said pulse generator, means for radiating pulses of radio frequency energy supplied by said transmitter, means for receiving said pulses after reflection, a cathode ray tube including electrodes for deflecting said ray along two coordinates, means for applying potentials from said sweep generator to deflect said ray along one coordinate, means for applying potentials from said receiver to deflect said ray along said other coordinate, an electrical bridge, means for deriving direct currents from said bridge, and means for applying said direct currents to deflect said ray with respect to one of said coordinates to indicate changes in said bridge balance.

5. An altitude indicating device including in combination a sweep circuit generator, a pulse generator synchronized by said sweep, a transmitter keyed by said pulse generator, means for radiating pulses of radio frequency energy supplied by said transmitter, means for receiving said pulses after reflection, a cathode ray tube including electrodes for deflecting said ray along two coordinates, means for applying potentials from said receiver to deflect said ray along said other coordinate, an electrical bridge, means for deriving direct currents from said bridge, and means for applying said direct currents to alter the phase of said pulses with respect to said sweep as a function of said bridge balance.

6. The method of indicating altitudes by means of a cathode ray tube and an electrical balancing circuit which includes indicating altitudes above a predetermined level by radiating toward the earth pulses of radio frequency energy, deflecting the cathode ray of said tube along a first coordinate thereof in synchronism with said pulses, receiving said pulses after reflection, deriving potentials from said received pulses, applying said potentials to deflect said cathode ray along a second coordinate of said tube to provide first altitude indications, balancing said circuit at a predetermined altitude, deriving currents from said circuit which vary as a function of the altitude below said predetermined level, and applying said derived currents to alter the first mentioned indication to thereby indicate altitudes below said predetermined level.

7. The method of indicating altitudes by means of a cathode ray tube and an electrical balancing circuit which includes indicating altitudes above a predetermined level by radiating toward the earth pulses of radio frequency energy, deflecting the cathode ray of said tube along a first coordinate thereof in synchronism with said pulses, receiving said pulses after reflection, deriving potentials from said received pulses, applying said potentials to deflect said cathode ray along a second coordinate of said tube to provide first altitude indications, balancing said circuit at a predetermined altitude, deriving currents from said circuit which vary as a function of the altitude below said predetermined level, and applying said derived currents to alter the phase of said pulses to thereby indicate altitudes below said predetermined level.

8. The method of indicating altitudes by means of a cathode ray tube and an electrical balancing circuit which includes indicating altitudes above a predetermined level by radiating toward the earth pulses of radio frequency energy, deflecting the cathode ray of said tube along a first coordinate thereof in synchronism with said pulses, receiving said pulses after reflection, deriving potentials from said received pulses, applying said potentials to deflect said cathode ray along a second coordinate of said tube to provide first altitude indications, balancing said circuit at a predetermined altitude, deriving currents from said circuit which vary as a function of the altitude below said predetermined level, and applying said derived currents to alter the starting point of said cathode ray deflection along said first coordinate to thereby indicate altitudes below said predetermined level.

IRVING WOLFF.
JARRETT L. HATHAWAY.

REFERENCES CITED

The following references are of record in the file of this patent:

UNITED STATES PATENTS

| Number | Name | Date |
| --- | --- | --- |
| 2,011,392 | Bentley | Aug. 13, 1935 |
| 2,280,725 | Shepard | Apr. 21, 1942 |
| 1,292,768 | Harle | Jan. 28, 1919 |